United States Patent
Alsop et al.

(10) Patent No.: US 8,572,190 B2
(45) Date of Patent: *Oct. 29, 2013

(54) METHOD AND SYSTEM FOR RECOGNIZING DESIRED EMAIL

(75) Inventors: John Alsop, Mississauga (CA); Christopher Gabe, Mississauga (CA); Robert Osborne, Mississauga (CA)

(73) Assignee: Watchguard Technologies, Inc., Seattle, WA (US)

( * ) Notice: Subject to any disclaimer, the term of this patent is extended or adjusted under 35 U.S.C. 154(b) by 479 days.

This patent is subject to a terminal disclaimer.

(21) Appl. No.: 12/628,901

(22) Filed: Dec. 1, 2009

(65) Prior Publication Data

US 2010/0077052 A1    Mar. 25, 2010

Related U.S. Application Data

(63) Continuation of application No. 11/370,932, filed on Mar. 9, 2006, now Pat. No. 7,627,641.

(51) Int. Cl.
*G06F 15/16* (2006.01)
*G06F 15/173* (2006.01)

(52) U.S. Cl.
USPC .......................................... 709/206; 709/223

(58) Field of Classification Search
USPC ............... 455/412.1; 709/207, 238, 203–206; 726/4, 11, 23, 27, 31, 13
See application file for complete search history.

(56) References Cited

U.S. PATENT DOCUMENTS

| | | | |
|---|---|---|---|
| 6,266,692 B1 | 7/2001 | Greenstein | |
| 6,829,635 B1 * | 12/2004 | Townshend | 709/206 |
| 7,243,163 B1 * | 7/2007 | Friend et al. | 709/248 |
| 7,788,033 B2 | 8/2010 | Isaji et al. | |
| 2002/0120600 A1 * | 8/2002 | Schiavone et al. | 707/1 |
| 2002/0162025 A1 * | 10/2002 | Sutton et al. | 713/201 |
| 2002/0199095 A1 | 12/2002 | Bandini et al. | |
| 2004/0006600 A1 * | 1/2004 | Miller et al. | 709/206 |
| 2004/0073617 A1 * | 4/2004 | Milliken et al. | 709/206 |
| 2004/0249895 A1 * | 12/2004 | Way | 709/206 |
| 2004/0258044 A1 * | 12/2004 | Girouard et al. | 370/352 |

(Continued)

FOREIGN PATENT DOCUMENTS

| | | |
|---|---|---|
| EP | 1564670 | 8/2005 |
| EP | 1613010 | 1/2006 |

(Continued)

OTHER PUBLICATIONS

Examination Report dated Feb. 29, 2012 as recieved in Canadian Application No. 2,644,237.

*Primary Examiner* — Joshua Joo
(74) *Attorney, Agent, or Firm* — Stoel Rives LLP; Kory D. Christensen (57) ABSTRACT

A system and method for recognizing an incoming email as a desired email examines outgoing email messages to arrange the email into fragments for which representations are created and stored. When an incoming message is received, the message is arranged into fragments for which representations are created. The representations of the incoming message are compared to the stored representations and if the matches between stored representations and the representations of the incoming message meet a predefined threshold test, the incoming message is recognized as being desirable. An incoming email message which has been recognized as being desirable can be subjected to a lesser examination to recognize a SPAM message, or to no further examination to recognize a SPAM message.

16 Claims, 5 Drawing Sheets

(56) References Cited

U.S. PATENT DOCUMENTS

| | | | |
|---|---|---|---|
| 2005/0021649 A1* | 1/2005 | Goodman et al. | 709/207 |
| 2005/0022008 A1* | 1/2005 | Goodman et al. | 713/201 |
| 2005/0081059 A1* | 4/2005 | Bandini et al. | 713/201 |
| 2005/0132197 A1 | 6/2005 | Medlar | |
| 2006/0036693 A1* | 2/2006 | Hulten et al. | 709/206 |
| 2006/0037070 A1* | 2/2006 | Davis et al. | 726/11 |
| 2006/0095966 A1* | 5/2006 | Park | 726/22 |
| 2006/0253447 A1* | 11/2006 | Judge | 707/9 |
| 2007/0011324 A1* | 1/2007 | Mehr et al. | 709/225 |
| 2008/0059590 A1* | 3/2008 | Sarafijanovic et al. | 709/206 |
| 2008/0133682 A1* | 6/2008 | Chadwick et al. | 709/206 |
| 2008/0250503 A1* | 10/2008 | Bandini et al. | 726/23 |

FOREIGN PATENT DOCUMENTS

| | | |
|---|---|---|
| WO | WO2004/068288 | 8/2004 |
| WO | WO2005/074213 | 8/2005 |
| WO | WO2006102164 | 9/2006 |

* cited by examiner

METHOD AND SYSTEM FOR RECOGNIZING DESIRED EMAIL

FIELD OF THE INVENTION

The present invention relates to a method and system for recognizing desired email. More specifically, the present invention relates to a system and method for recognizing desired email that can require less rigorous examination by filters and systems for detecting SPAM or other undesired content.

BACKGROUND OF THE INVENTION

Unsolicited and/or undesired commercial email is a significant problem for email administrators and users. A common category of undesired email is SPAM which is generally defined as bulk unsolicited email, typically for commercial purposes, and other categories of undesired email can be bulk email containing viruses and/or malware and the like.

At best, undesired email utilizes resources on email systems, occupies email account holder's time to review and delete and is generally frustrating and troublesome. At worst, undesired email can be malicious and can damage software, systems and/or stored data.

Much work has been undertaken in recent years to combat the growing problem of undesired email. One of the methods used to date to reduce undesired email in the form of SPAM is the use of Bayesian filtering wherein the content of received emails is examined for specified content to form a statistical decision as to whether the email constitutes SPAM. A message which is deemed to be SPAM can be flagged as such and/or directed to a selected storage folder or deleted from the system.

Another method to reduce undesired email is the use of scanners which examine emails to recognize viruses and/or malware and quarantine or delete the detected undesired email.

Another method commonly employed to date is the use of blacklists which identify IP addresses from which undesired email has been previously been received and which deem subsequent emails from those IP addresses as being undesired email.

Yet another method is described in U.S. Pat. No. 6,330,590 to Cotton wherein a checksum is calculated for each received email and is compared to a database of checksums of previously identified SPAM to determine if the received message is SPAM.

As can be imagined, as each new technical solution to detecting undesired email is introduced and deployed, the originators of undesired email alter their messages and/or sending techniques in attempts to circumvent the undesired email detection systems. Presently, the best practice for undesired email detection is to employ two or more different detection methods to obtain a synergistic result for the detectors.

While such multi-method detection systems can work reasonably well, they do suffer from some disadvantages. Specifically, many detection systems require regular and skilled input from email administrators or others to respond to changes effected by the originators of undesired email. Further, generally undesired email detection systems are configured to err on the side of caution in an attempt to avoid "false positive" detections and are therefore configured to operate at less than their maximum level of sensitivity for detecting undesired email. This is because, typically, it is deemed to be less harmful to receive some undesired email than to have a bona fide email flagged as undesired and be removed or quarantined.

Accordingly, users often still receive some amount of undesired email despite the active management of the process by email administrators and the use of the best multi-method undesired email detection systems.

SUMMARY OF THE INVENTION

It is an object of the present invention to provide a novel method and system for recognizing desired email which obviates or mitigates at least one disadvantage of the prior art.

According to a first aspect of the present invention, there is provided a method of recognizing an incoming email message as being desired, comprising the steps of: (i) arranging the contents of an outgoing email message into at least one message fragment; (ii) for each message fragment creating a representation of at least a portion of the contents of the fragment; (iii) storing each created representation; (iv) arranging the contents of an incoming email message into at least one message fragment; (v) for at least one message fragment of the incoming message creating a representation of at least a portion of the contents of the fragment; (vi) comparing each representation of a fragment created in step (v) to the stored representations created in step (ii) to identify matches therebetween; and (vii) identifying the incoming email message as being desired if the matches identified meet a pre-defined threshold test.

Preferably, a time to live, or expiry, value is stored with each created representation of step (ii) and each created representation is removed from the storage when the associated time to live or expiry value is exceeded.

According to another aspect of the present invention, there is provided email system comprising: at least one incoming email server; at least one outgoing email server; at least one email firewall device; and at least one fingerprinting device which is operable to: (a) prior to delivering an outgoing email, arrange the outgoing email into at least one message fragment and to create and store a representation of each of the at least one message fragments of the outgoing email; (b) upon receipt of an incoming email, arrange the incoming email into at least one message fragment and to create a representation of each of the at least one message fragments of the incoming email; (c) to compare each of representations created for each of the at least one message fragments of the incoming email to the stored representations; and (d) if the matches between the stored representations and the at least one representations of the message fragments of the incoming email meet a pre-defined threshold test, then identifying the incoming email as desired.

The present invention provides a system and method for recognizing an incoming email as a desired email. The system and method examines outgoing email messages to arrange the email messages into fragments for which representations are created and stored. When an incoming message is received, fragments of the incoming message are arranged and representations of these fragments are created. These representations are compared to the stored representations and, if the number of correspondences between these representations and the stored representations exceeds a threshold value, the incoming message is recognized as being desirable.

An incoming email message which has been recognized as being desirable can be subjected to a lesser (less stringent)

examination to recognize a SPAM message, or to no further examination to recognize a SPAM message.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
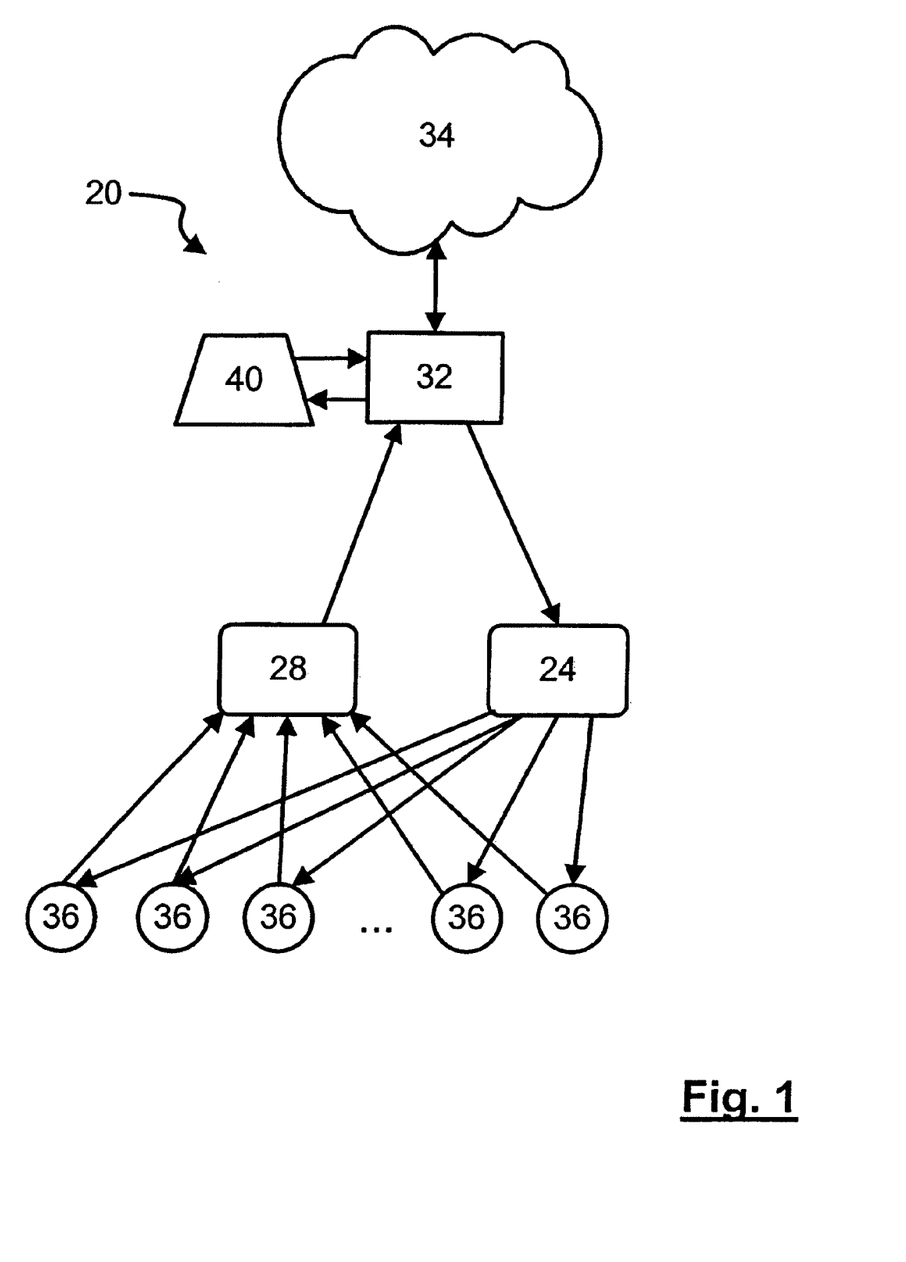
FIG. 1 shows an email system in accordance with the present invention.

An email system which implements a method in accordance with of the present invention is indicated generally at 20 in FIG. 1. Email system 20 includes at least one incoming email server 24 and at least one outgoing email server 28. In some small installations, incoming email server 24 and outgoing email server 28 execute on a single device but, more generally, in order to accommodate the volume of email messages in system 20 one or more devices will execute incoming mail servers 24 and one or more other devices will execute outgoing email servers 28.

System 20 further includes an email firewall 32, such as the Mxtreme™ Mail Firewall manufactured and sold by the assignee of the present invention, which connects incoming email server 24 and outgoing email server 28 to the public network 34 (typically the Internet). Email firewall 32 provides a variety of services, including security/firewall functions, spam detection and filtering, virus scanning, etc.

Incoming email is first processed by email firewall 32 to identify and/or quarantine undesired email messages and/or email attachments infected with viruses and the remaining messages are passed to incoming email server 24 where they can be accessed by their intended recipients from amongst email users 36. Email firewall 32 can be configured to examine email originating from public network 34 and email originating from other users 36 within the private network of users 36.

As mentioned above, in prior art undesired email detection systems incoming messages are examined using a variety of tools and/or methods to attempt to identify undesired email messages. One problem with such detection systems is that, in order to reduce the likelihood of false positives (i.e. non-SPAM messages which are incorrectly identified as SPAM), the systems are typically configured with their sensitivity levels set to less aggressive levels than might otherwise be desired and undesired email may be allowed to traverse email firewall 32. Further, even with reduced sensitivity settings, false positives can still occur.

The present inventors have developed a novel approach wherein, instead of attempting to identify an incoming email message as undesired email, they instead identify, where possible, incoming email messages as desired email. Then, depending upon the implementation of email system 20 and the required confidence level with which undesired email is detected, with the present invention an identified desired message can be allowed to bypass the undesired email detection processes of email firewall 32 altogether, or can be processed by the undesired email detection systems of email firewall 32 with their sensitivity levels configured at less aggressive levels, etc. while emails which have not been identified as desired can be processed with the sensitivity levels of the undesired email detection systems configured to more aggressive levels.

In operation, a method and system in accordance with the present invention examines email messages sent by users 36 within email system 20. Each message is examined and arranged into one or more message fragments which are then processed to provide a checksum or other suitable "fingerprint" which allows for the subsequent recognition of that fragment in a simple and highly confident manner.

A fragment can be any portion of an email message which is likely to be reproduced in a reply email to the email being sent. An ideal example of a fragment is a predefined signature and/or an email legal disclaimer statement, as many corporate email users regularly include such standardized text in their outgoing email messages.

Figure 2:
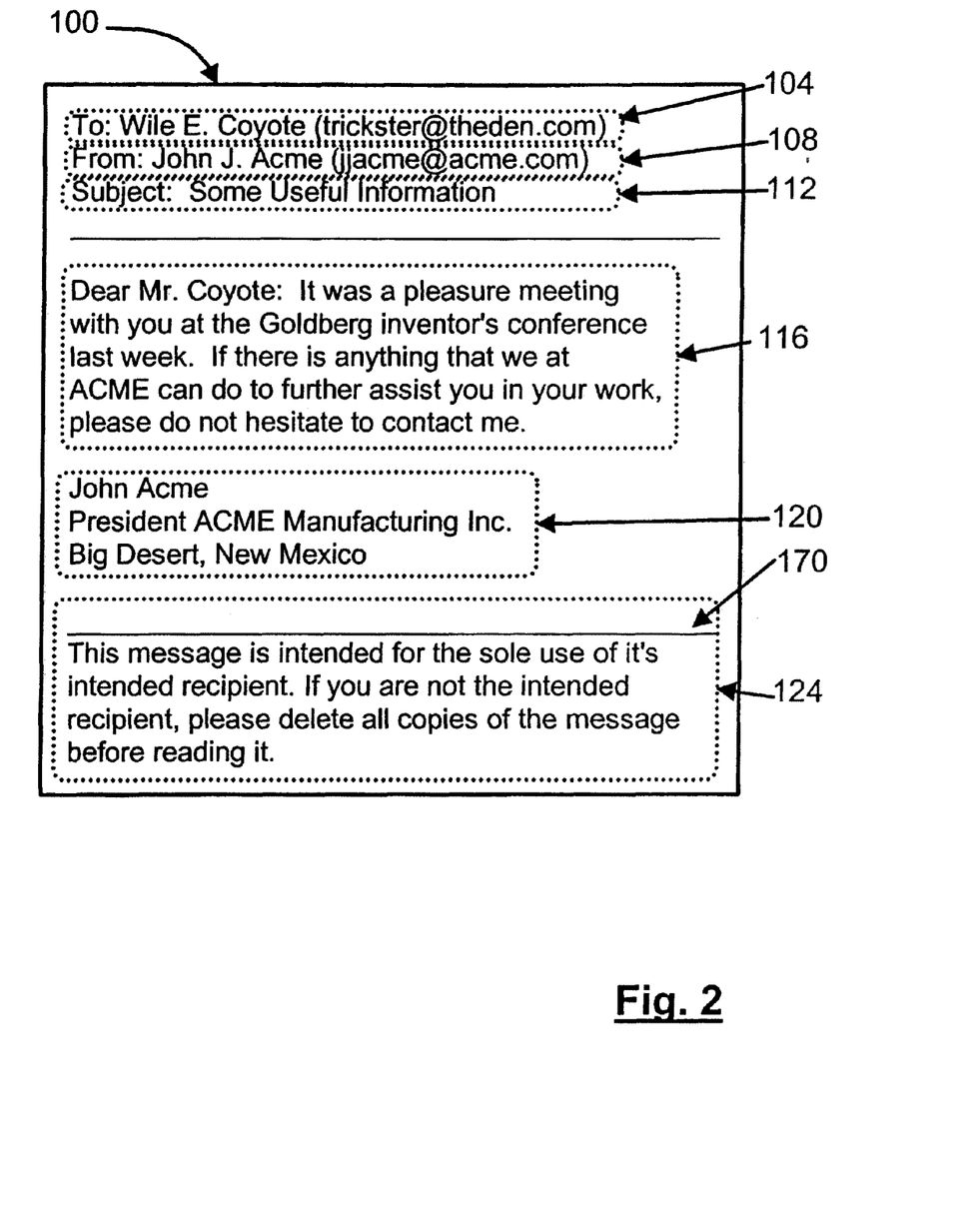
FIG. 2 shows a sample outgoing email message.

A typical email message 100 is illustrated in FIG. 2. As illustrated, this email message includes a "To" address data field 104, a "From" address data field 108, a "Subject" line data field 112 and a main message body data field 116 which can also include a signature 120 and an email legal disclaimer 124. Such message formats, or variations on such formats, are widely used in large and small corporations and by individuals.

With the present invention, when an email is created and sent by a user 36 from outgoing an email server 28, the email is first examined by a fingerprinting process, which can be executing on a dedicated fingerprinting device 40 or which can be a process executing on email firewall device 32 or one of the incoming email server 24 and/or outgoing email servers 28.

If email system 20 comprises multiple outgoing email servers 28, or if the expected email volume is high, it is contemplated that the fingerprinting will preferably execute on dedicated fingerprinting device 40, as illustrated in FIG. 2, that operates in conjunction with email firewall device 32.

The present invention employs the principle that, for much desired email between parties, some repetition of the content of an outgoing email message will be included in an incoming reply email. Examples of such repetition include the common practice of including at least the relevant portions of the outgoing (originating) email into the incoming (reply) email, repeating the subject line with a "RE:" pre-pended to it, etc. It is believed that the originators of undesired email will typically not have access to an email originated from within an email domain and thus undesired email messages can not include repetition of the content of an outgoing email originated in email system 20.

Figure 3:
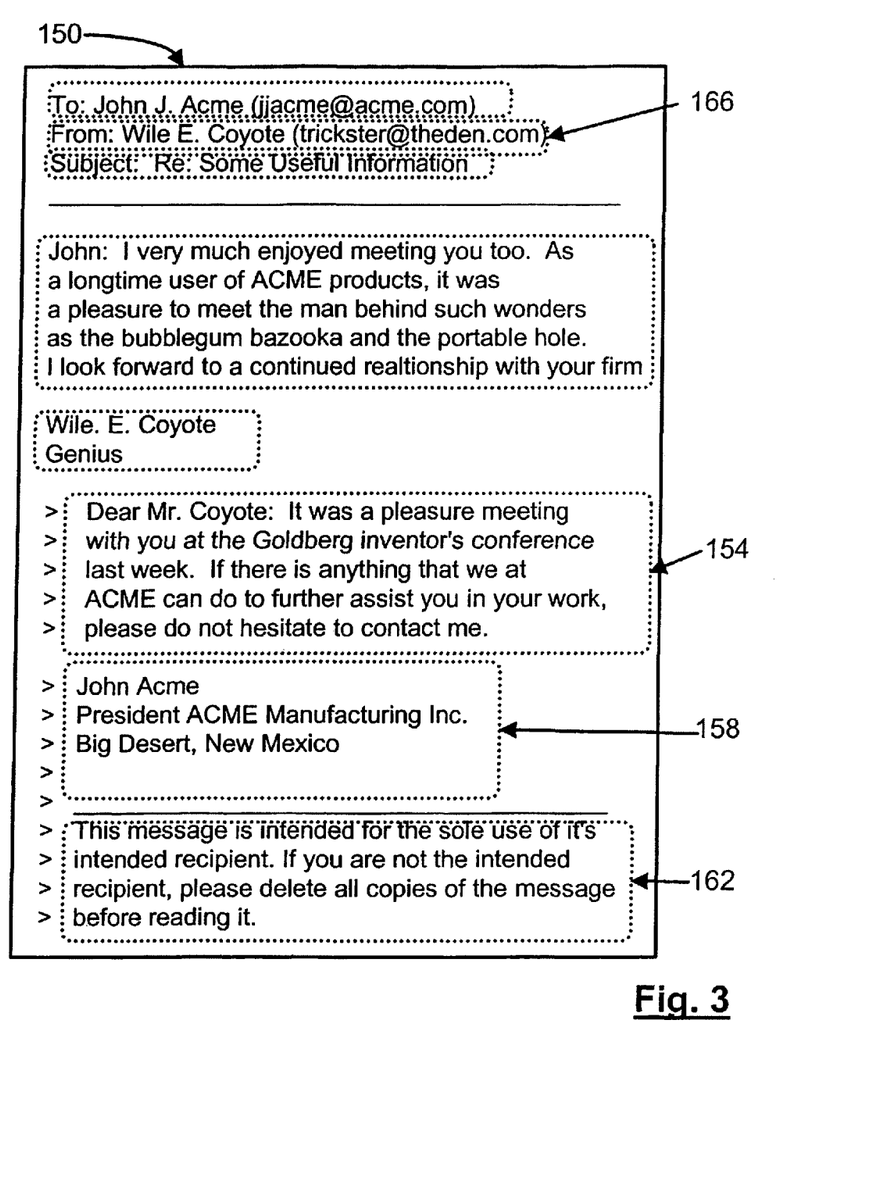
FIG. 3 shows a sample incoming email message responding to the email message of FIG. 2.

An example of a reply email 150 to email 100 is illustrated in FIG. 3. As illustrated, email 150 includes several fragments representing repetition of original email 100. Specifically, fragment 154 is an indented copy of the main body of email 100, fragment 158 is an indented copy of the signature of email 100 and fragment 162 is an indented copy of the disclaimer of email 100. In addition, fragment 166 is the originator's address which corresponds to the destination address of email 100.

Figure 4:
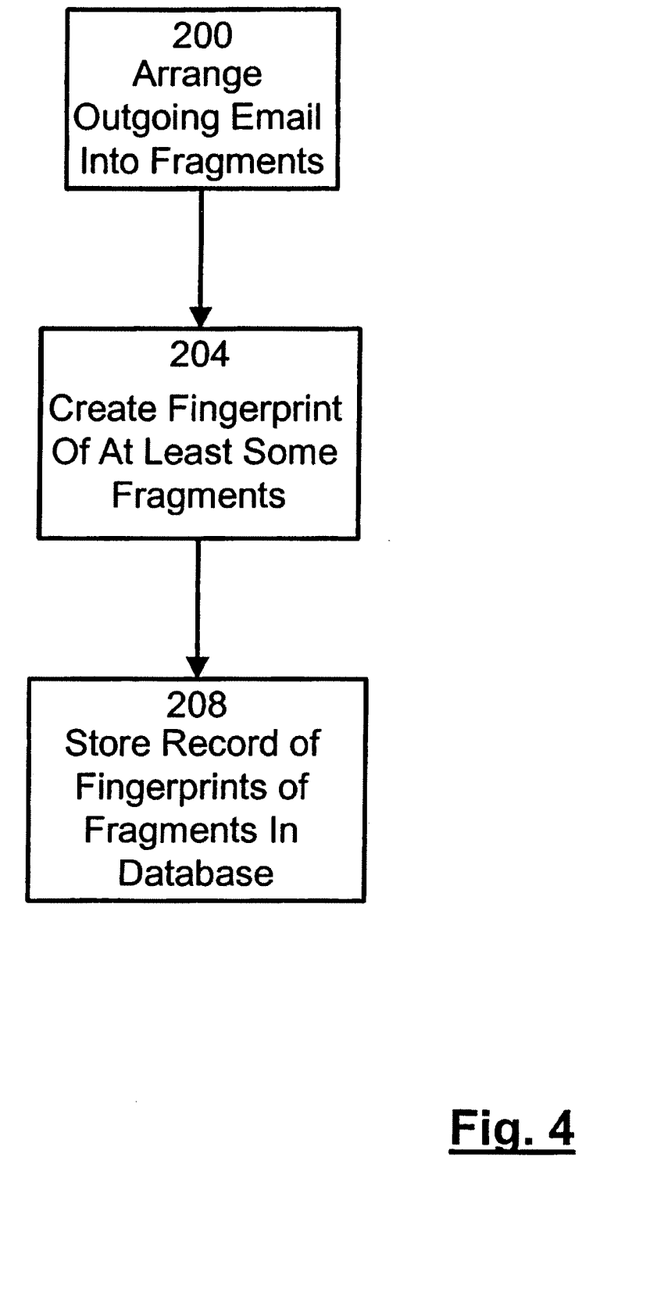
FIG. 4 shows a flowchart of a process of the present invention applied to outgoing email messages.

A method in accordance with the present invention will now be described with reference to the flowcharts of FIGS. 4 and 5. The method commences at step 200 wherein an outgoing email message, such as message 100, is arranged into one or more fragments. The particular method of arranging an outgoing email into fragments is not particularly limited and can be as simple as deeming the outgoing and originating email addresses as fragments, the subject line as a fragment, and any two or more consecutive lines of the message text as fragments.

Alternatively, the email can be parsed using a variety of templates and/or metadata in an attempt to identify fragments, such as the first two sentences of each paragraph of main body text of the email, which have a reasonable likelihood of being repeated in a reply to the email.

It is also contemplated that any attachments to the outgoing email, such as Vcards or data files, can also be selected as fragments.

Preferably, the method of arranging the outgoing message into fragments will omit common formatting features, such as line 170 of email 100, repeated streams of characters such as "++++++", ">>", or "--------", whitespace or other similar features whose presence might easily be guessed by the originator of an undesired email.

As illustrated in FIG. 2, email message 100 has been arranged into six fragments, namely the above-mentioned "To" address data field 104, "From" address data field 108, "Subject" line data field 112, main message body data field 116; signature 120 and disclaimer 124. If the main body message field of email 100 included two or more paragraphs, it is contemplated that each paragraph can be arranged as a separate fragment, or portions of each paragraph can be arranged as separate fragments, etc.

Once the outgoing email has been arranged into one or more fragments, the method continues at step 204 where the fingerprinting process creates a characterizing record, or fingerprint, for at least some of the fragments. The fingerprint can be a complete copy of the identified fragment, or a portion thereof, or a representation of the fragment, such as an MD5 hash or other checksum of the fragment. For example, the fingerprint can comprise a copy of the first twenty-five characters of the first line of a paragraph, etc.

Ideally, a fingerprint will be created at step 204 for each fragment of the email, but it is also contemplated that, for long, multi-paragraph emails, it may be desired to omit creating fingerprints for some of the fragments to reduce processing time and the amount of storage space required to subsequently store the fingerprints.

However, as will be apparent to those of skill in the art, this is a compromise which the administrator of system 20 should manage appropriately as the greater the number of fragments for which a fingerprint is created and stored, the greater the likelihood that incoming email message, such as message 150, will repeat a fragment whose fingerprint is stored in the database, as described below.

At step 208, a record is added to a database maintained in system 20, typically in email firewall 32, and each record contains at least the fingerprints of the fragments created at step 204.

In addition to the storing fingerprints of fragments, in a preferred embodiment of the method, the record added to the database at step 208 can also include: the identity of the sender of the email; the date on which the email was sent; the address of the intended recipient(s) of the email; an indication of the source of the fragment, i.e. the Subject line data field, or the main message body data field, an attachment, etc.; and a "time to live" (TTL), or "expiry", value. The TTL value is selected by the administrator of system 20 as the time for which records of fingerprints for an outgoing email remain in the database. As will be apparent, the selection of an appropriate TTL value consists of a tradeoff between the size of the database and the likelihood that fingerprints of repeated information in an incoming email will be in the database.

As mentioned above, it is common that an email have multiple recipients in it's "To" address data field 104 and/or can include one or more recipients in a "CC" address data field, not shown in FIG. 2. In such a case, it is contemplated that the record stored in the database can include the address of each intended recipient.

In the event that, at step 208, a record already exists in the database for a fragment, which will occur when the same text is included in multiple outgoing messages (for example disclaimer 124 or signature 120), the TTL value for the existing record can be updated to reflect the date of the most current outgoing email including the fragment, rather than adding a redundant record.

Figure 5:
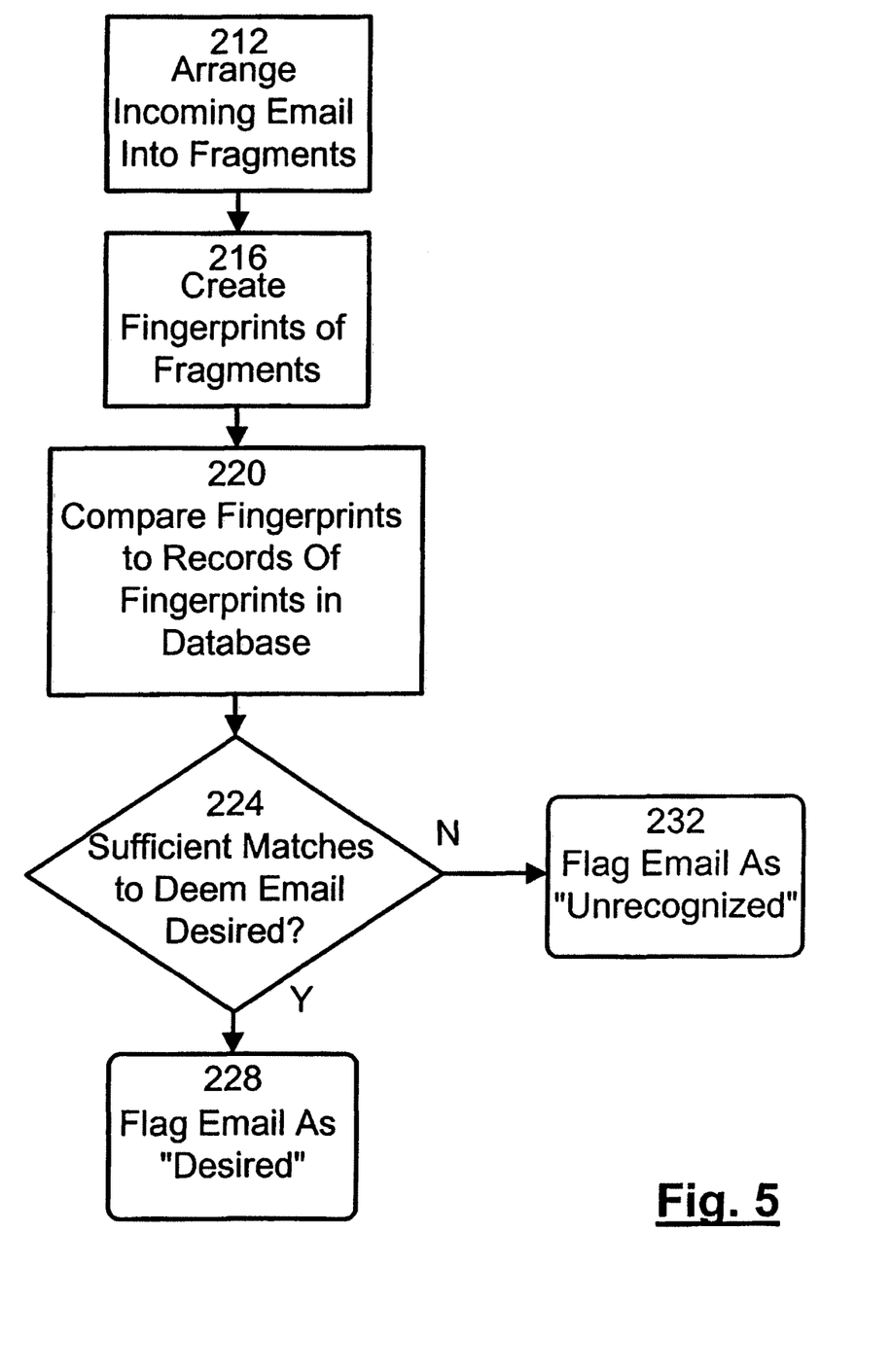
FIG. 5 shows a flowchart of a process of the present invention applied to incoming email messages.

The flowchart of FIG. 5 shows the steps of the method when an email is received from public network 34 or from another user 36. Specifically, at step 212 each incoming email received is processed to arrange its contents into fragments. Preferably, this processing uses a process similar to that employed at step 200 on outgoing email messages to increase the likelihood of obtaining similar fragments. For example, if at step 200 fragments are created for the first two lines of each paragraph of the main message body, then at step 212 it is preferable to also create fragments for the first two lines of each paragraph of the main message body.

At step 216 the method creates fingerprints of the arranged fragments. While the process of creating fingerprints for the fragments will employ a similar algorithm (copying a portion of the fragment, performing a hash, etc.) as step 204, in step 216 the fingerprinting process preferably includes some additional pre-processing.

Specifically, fragments can be preprocessed to remove common modifications to information repeated in email replies. For example, many email clients append "RE:" as prefix text to a subject line data field of a message replying to a previous message, as illustrated in FIG. 3. It is contemplated that the fingerprinting process of step 216 will remove the "RE:" portion of a subject line fragment when creating a fingerprint of that fragment.

Similarly, when embedding a portion of a previous email message main body in a subsequent message, many email clients indent the text and prefix it with a symbol or characters such as ">", as illustrated in fragments 154, 158 and 162 of FIG. 3. It is contemplated that the fingerprinting process of step 216 will remove the indent or other whitespace and the ">", or similar prefix character, on each line of text being fingerprinted when creating a fingerprint of fragments of text lines commencing with such characters or symbols.

As will be apparent to those of skill in the art, other pre-processing steps can be performed, as desired, to remove the influence of normal and/or expected modifications to repeated text in the incoming email 150.

At step 220, the fingerprints created at step 216 are compared to those stored in the database of fingerprints to identify each, if any, match between the stored fingerprints from previous outgoing emails and the fingerprints created from the incoming email under consideration.

While at step 204 fingerprints were not necessarily created for all arranged fragments of the outgoing email, at step 216 it is preferred that fingerprints be created for each fragment of the incoming email to increase the likelihood that a desired email will be recognized, as described below. Unlike the case of fingerprints created at step 204, the fingerprints for received emails are not stored in a database and are only stored for sufficient time to execute the comparisons of step 220. Thus, it is believed to be practical to create fingerprints for each fragment of an incoming email at step 216.

At step 224 the number of matches, if any, between the fingerprints created for the incoming message and the stored fingerprints in the database is compared to a pre-selected threshold value or template. A pre-selected threshold value or template can be selected by the administrator of system 20 to reflect the required level of confidence for an incoming email message to be deemed to be "desirable".

In some circumstances, the administrator may be satisfied that a single matching fingerprint is sufficient to distinguish a desirable incoming email from an undesirable one. In other circumstances, the administrator may require that two or more fingerprints match before the incoming email be deemed to be desirable.

The administrator can also defined a template, or set of rules, which define the threshold that an incoming email message must meet before being deemed as a desired message. For example, a template can be defined which specified that at least one fingerprint match and that the address of the originator of the incoming email match with one of the destination email addresses stored with the fingerprint at step 208.

As will be apparent to those of skill in the art a wide range of other thresholds and/or templates can be applied as desired, including multi-rule tests which allow an email administrator to define templates such as an email being deemed desired when any one of the following conditions is met: (i) three or more fragments of the received email match records of fragments stored in the database; (ii) the originator email address matches the destination email address, the subject line (less any "RE:" or other standard prefix) matches a record in the database and at least one other fragment matches a record in the database; or (iii) the originator email address matches the destination email address, a fragment containing an included disclaimer or signature matches a record in the database and at least one other fragment matches a record in the database; etc.

If the incoming email satisfies the test, or tests, at step 224, the incoming email can be flagged as being "desirable" at step 228 for further processing by system 20. Alternatively, if the incoming email does not satisfy the test or tests of step 224, it can be deemed as being "unrecognized" at step 232 for further processing by system 20.

It is contemplated that an incoming email which has been flagged as being "unrecognized" will be further processed in a conventional manner, which can include processing in email firewall 32 by anti-SPAM filters, anti-virus scanning, etc.

An incoming email which has been flagged as being "desired" can be further processed in a variety of manners. For example, if at step 224 a sufficiently high threshold is employed, emails which have been deemed as "desired" can be forwarded to the mailbox of the intended email user 36 without further processing.

Alternatively, it is also contemplated that an incoming email which has been flagged as "desired" can undergo all subsequent processing (anti-SPAM filters, virus scanning, etc.) that would occur for an email flagged as unrecognized, however in this case the subsequent processing can be performed with the sensitivity levels of those processes being adjusted to reflect the increased confidence the "desired" flag provides. In this manner, false positive results can be reduced for incoming email flagged as "desired".

As another alternative, the number and/or type of comparison tests an incoming email meets at step 224 can be provided as an input parameter to the anti-SPAM filtering process and/or other process which subsequently consider the incoming email with their sensitivities and/or processes tuned accordingly. For example, an incoming email which was found to have fingerprints for ten of its twelve fragments stored in the database may be subject to no anti-SPAM filter process, while an incoming email which was found to have fingerprints for just two of its twelve fragments stored in the database may be subject to the anti-SPAM filter process with the sensitivity level of the filter set to a moderate level.

As another example, an incoming email which has been found to have a single fingerprint of its twelve fragments stored in the database but which also has an originator address that matches that stored in the database for that fingerprint may be subject to no anti-SPAM filtering. Other thresholds and/or configurations of the present invention for use in system 20 will be apparent to those of skill in the art.

It is further contemplated by the present inventors that the present invention can be employed to assist in the construction of "white lists" for use in email firewall 32. Specifically, as is known, email firewalls can utilize lists of email addresses and/or IP addresses which are known as being sources of SPAM or other undesired email, typically referred to as "blacklists" and lists of email addresses and/or IP addresses which are known as being legitimate sources of non-SPAM emails, typically referred to as "white lists".

Email firewall 32 can compare the originating email address and/or IP address for each incoming email with those on white lists and blacklists which it maintains. An incoming email with an originating email address or IP address on the blacklist is deemed to be undesired and is treated accordingly. An incoming email with an originating email address and/or IP address on the white list is deemed to be non-SPAM and is treated accordingly, for example being virus scanned but otherwise forwarded to the intended recipient.

While white lists and blacklists provide a useful tool, a difficulty exists in the construction and maintenance of the lists. While the construction and maintenance of the lists can, to some degree, be automatically performed by email firewall device 32, they still require manual administration by the administrator of the email system, especially to construct and maintain the white list. However, with the present invention, an incoming email which meets a threshold at step 224 can have its originating email address and/or IP address automatically added to the white list.

It is further contemplated that the present invention can also be employed to recognize at least some third party emails as desirable. Specifically, an outgoing email can be received by the addressee who then forwards that received email, perhaps with added comments, to a third party. If that third party then replies to the forwarded email to the originator of the email, then that reply can be processed by the present invention, as described above, to recognize fragments of the original email which have been included in the reply.

For example, many email clients attach a "FW:" prefix to the subject line data field of forwarded emails. In determining fingerprints for subject line data fields, the present invention can ignore such prefixes so that the fingerprint stored for a subject line data field such as "2006 Budget Figures" will match a received subject line data field such as "FW: 2006 Budget Figures" or "RE: FW: 2006 Budget Figures", etc.

In this manner, and depending upon the confidence level required by the email administrator, the present invention can recognize emails of third parties entering a desired email thread.

In the event that an email user 36 of system 20 is infected with a virus or worm rendering them into an unintentional originator of undesired emails (typically referred to as a SPAMbot or virus source) which results in the email user 36 dispatching a series of undesired emails or if the email user 36 otherwise sends a series of undesired messages for any reason, the database of fingerprint records will be contaminated and will contain fingerprints for the content of the undesired messages.

In such a case, the administrator of system 20 can purge the offending records from the database by specifying deletion of records meeting appropriate criteria, such as emails sent by the specified email user 36 in a specified date range of interest. The methods of purging records from a database that meet a set of selection criteria, such as those mentioned above, are well known to those of skill in the art and need not be further discussed herein.

The present invention provides a unique and flexible system and method for recognizing desired emails. Unlike existing undesired email detection systems which scan incoming emails to identify indications that the email is an undesired, the present invention scans the incoming email to identify indications that the email is a desired message.

While the originators of undesired email messages continually modify their messages (misspelling keywords, embedding graphics representing portions of text messages, rather than the text itself, etc.) in attempts to avoid detection by anti-SPAM filters and systems, the present invention requires an incoming email message to include information which will typically not be available to the originators of SPAM or other undesired email and which cannot be guessed by them.

The system and method is transparent to email recipients and originators, who need take no extraordinary steps, and can prevent or reduce the number of false positives which might otherwise result from anti-SPAM processes.

The above-described embodiments of the invention are intended to be examples of the present invention and alterations and modifications may be effected thereto, by those of skill in the art, without departing from the scope of the invention which is defined solely by the claims appended hereto.

We claim:

1. A method of recognizing an incoming email message, received at an email firewall, as being non-SPAM, comprising the steps of:
    arranging contents of an outgoing email message, received at the email firewall from a private network, into outgoing message fragments, each outgoing message fragment corresponding to a portion of the contents of the outgoing email message;
    for each outgoing message fragment, creating a stored outgoing message fragment representation of at least a portion of the outgoing message fragment;
    designating the stored outgoing message fragment representation as corresponding to a non-SPAM message based on the outgoing message fragment originating in an outgoing email message;
    arranging contents of the incoming email message, received at the email firewall from a public network, into at least one incoming message fragment, each incoming message fragment corresponding to a portion of the contents of the incoming email message;
    for each incoming message fragment, creating an incoming message fragment representation of at least a portion of the incoming message fragment;
    comparing each incoming message fragment representation to the stored outgoing message fragment representations to identify matches therebetween, wherein matches indicate a portion of the contents of the outgoing email message in the contents of the incoming email message; and
    identifying the incoming email message as being non-SPAM in response to the contents of the incoming email message comprising a threshold amount of the contents of the outgoing email message based on the matches between the incoming message fragment representations and the stored outgoing message fragment representations exceeding a pre-defined threshold test.

2. The method of claim 1, wherein one of the outgoing message fragments is an address of an intended recipient of the outgoing email message.

3. The method of claim 1, wherein creating an outgoing message fragment representation comprises copying a portion of the outgoing message fragment.

4. The method of claim 1, wherein creating an outgoing message fragment representation comprises forming a hash of at least a portion of the outgoing message fragment.

5. The method of claim 1, wherein a respective time value is associated with each stored outgoing message fragment representation and each stored outgoing message fragment representation is removed from storage when the associated time value is exceeded.

6. The method of claim 1, wherein the pre-defined threshold test comprises comparing the number of identified matches to a threshold value.

7. The method of claim 1, wherein the pre-defined threshold test comprises a template defining one or more specific matches that must be found in a subject message.

8. The method of claim 6, wherein the number of identified matches is provided as a parameter to a subsequent process operating on the incoming email message.

9. The method of claim 1, wherein creating an incoming message fragment representation comprises ignoring a pre-defined set of characters in the incoming message fragment.

10. The method of claim 1, further comprising forwarding an incoming email message identified as being non-SPAM to an intended recipient without being processed by an anti-SPAM filter.

11. The method of claim 1, further comprising: identifying the incoming email message as being unrecognized if the matches identified between the incoming message fragment representations and the outgoing message fragment representations do not meet the pre-defined threshold test.

12. An email system, comprising:
    at least one incoming email server, at least one outgoing email server,
    at least one email firewall device; and
    at least one fingerprinting device, which is operable to:
        receive an outgoing email from a private network;
        prior to delivering the outgoing email, arrange contents of the outgoing email into at least one outgoing message fragment and to create and store an outgoing message fragment representation of each outgoing message fragment of the outgoing email;
        designate the outgoing message fragment representations as corresponding to non-SPAM messages based on the outgoing message fragment originating in an outgoing email message;
        upon receipt of an incoming email from a public network, arrange contents of the incoming email into at least one incoming message fragment and to create an incoming message fragment representation of each incoming message fragment of the incoming email;
        identify matches between the at least one incoming message fragment representations to the stored outgoing message fragment representations, the matches indicating a portion of the contents of the outgoing email message in the contents of the incoming email message; and identify the incoming email as non-SPAM when the incoming email message comprises a threshold amount of the contents of the outgoing email message based on the identified matches exceeding a predefined threshold test.

13. The email system of claim 12, wherein the at least one fingerprinting device is the at least one email firewall device.

14. The email system of claim 12, wherein an outgoing message fragment representation comprises a copy of at least a portion of the outgoing message fragment.

15. The email system of claim 12, wherein an outgoing message fragment representation comprises a hash of at least a portion of the outgoing message fragment.

16. An email server comprising an email fingerprinting device, configured to:

arrange content of an outgoing email message received from a private network into a plurality of stored outgoing message fragments, each stored outgoing message fragment corresponding to a portion of the content of the outgoing email message;

designate the outgoing message fragment representations as corresponding to non-SPAM messages based on the outgoing message fragment originating in an outgoing email message;

arrange content of an incoming email message received from a public network into a plurality of incoming message fragments, each incoming message fragment corresponding to a portion of the content of the incoming email message; and identify the incoming email message as non-SPAM when the incoming email message comprises a threshold amount of the content of the outgoing email message as indicated by matching a predetermined threshold of the incoming message fragments to the stored outgoing message fragments.

* * * * *